United States Patent [19]

Eichenhofer et al.

[11] 4,022,337
[45] May 10, 1977

[54] HOIST MECHANISM FOR USE IN A VEHICLE SUCH AS A BUS

[75] Inventors: Josef Eichenhofer, Brampton, Canada; Karl Schubert, Cleveland, Ohio

[73] Assignee: Urban Transportation Development Corporation Ltd., Toronto, Canada

[22] Filed: Oct. 17, 1975

[21] Appl. No.: 623,458

[52] U.S. Cl. .............................. 214/75 R; 214/730
[51] Int. Cl.² ............................................. B60P 1/46
[58] Field of Search ............. 214/75 R, 75 H, 75 T, 214/77 R, 77 P, 730; 280/166; 296/28 A, 146; 105/443, 444, 447, 448, 449, 450; 182/88, 91

[56] References Cited

UNITED STATES PATENTS

| 2,941,483 | 6/1960 | Lundberg | 105/448 |
| 3,574,322 | 4/1971 | Hancock | 280/166 |
| 3,893,697 | 7/1975 | Blitz et al. | 214/77 R |
| 3,912,048 | 10/1975 | Manning | 214/75 R |

FOREIGN PATENTS OR APPLICATIONS

| 1,349,760 | 4/1974 | United Kingdom | 280/166 |

Primary Examiner—Robert J. Spar
Assistant Examiner—Lawrence E. Williams
Attorney, Agent, or Firm—Cushman, Darby & Cushman

[57] ABSTRACT

The entrance step-well of a bus or the like converts from regular step mode to a lift mode for use in lifting wheel chair or the like, by extending the bottom of the well and simultaneously folding the intermediate step away from the step-well space. The extended bottom is free for vertical movement between the ground and the bus level.

21 Claims, 10 Drawing Figures

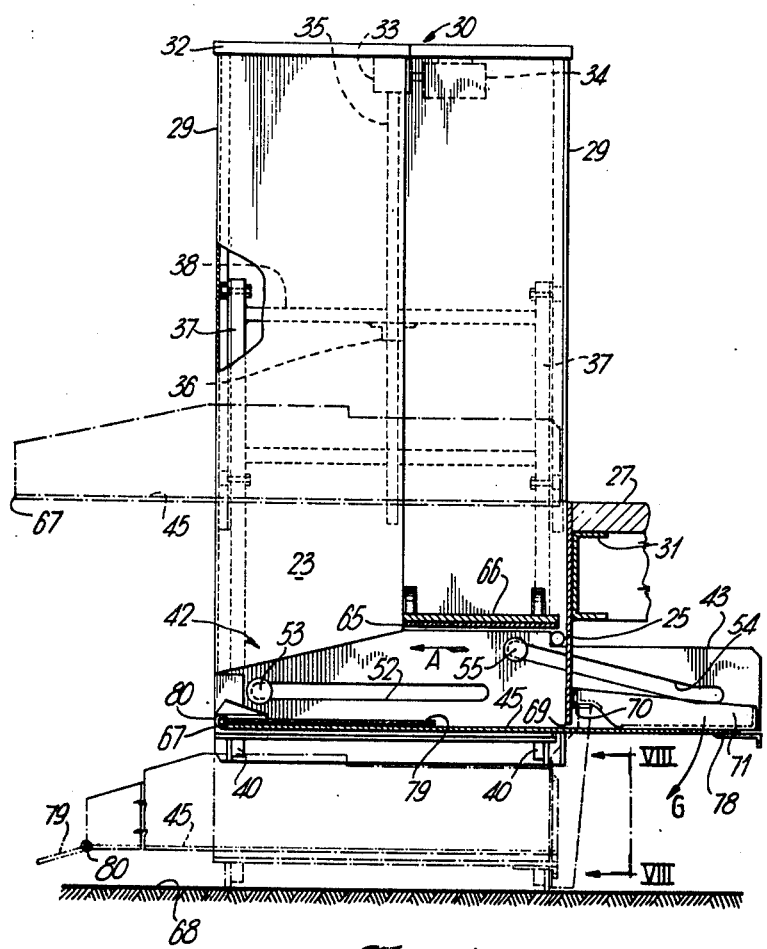
Fig- 4-

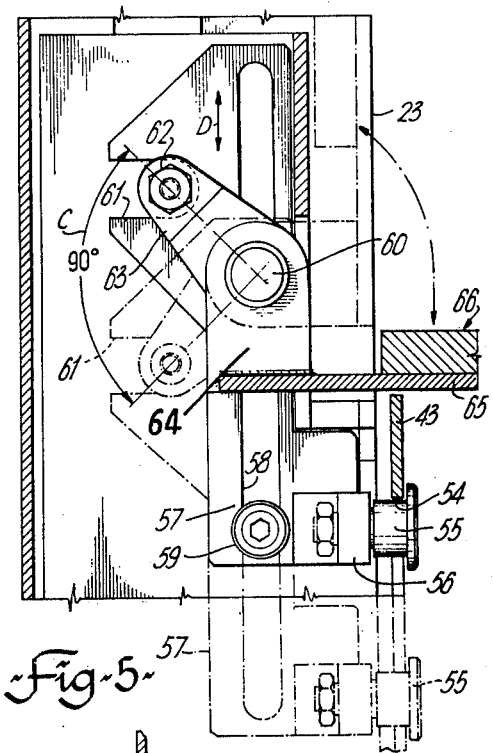
Fig-5-
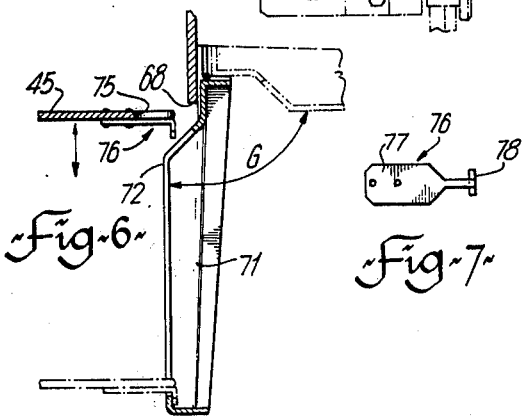
Fig-6-
Fig-7-

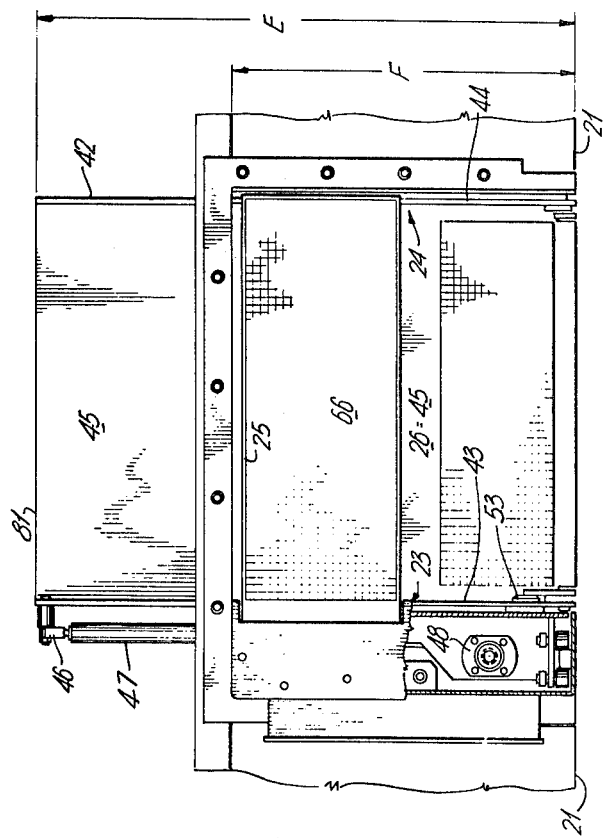

HOIST MECHANISM FOR USE IN A VEHICLE SUCH AS A BUS

The present invention relates to a hoist mechanism for use in a transportation vehicle such as a bus, particularly for facilitating the loading of such vehicles with a wheel chair.

Hoist mechanism of different types are known, which are adapted for use with different vehicles. Generally, they comprise a horizontal platform which can be extended beyond the door or tailgate opening of the vehicle, then lowered to the ground, loaded with a load and elevated to the vehicle floor level, whereby the load can easily be transferred or rolled from the platform to the floor. Canadian Pat. No. 527,368, issued July 10, 1956, Canadian Pat. No. 570,225 issued Feb. 10, 1959, Canadian Pat. No. 668,485 issued Aug. 13, 1963 and Canadian Pat. No. 692,825 issued Aug. 18, 1964 are few of many examples of such mechanisms.

It is also known to provide lift devices adapted for use with vehicles and designed especially for facilitating the loading of such vehicle with wheel chairs while the user is in the chair; Canadian Pat. No. 904,802 issued July 11, 1972 or U.S. Pat. No. 3,516,559 issued June 23, 1970 are typical examples of such solutions.

The common requirements the devices of this type have to meet is that they provide the required strength and rigidity together with safety and that, at the same time, they occupy as little floor space of the vehicle as possible. These two basic requirements are met by utilizing some elements of the device for dual purpose; e.g. the raising platform is eventually used as a truck tailgate or the like.

The basic common drawback of the known devices is that they do not provide for a quick conversion of the entrance of the vehicle, whereby the entrance would be converted from the lifting mode to a regular use mode. For instance, if one considers a bus, a passenger railroad car or the like, it will be appreciated that it is desirable, on the one hand, to be able to use the entrance for loading of, say, a person on a wheel chair, and, on the other hand, to readily convert the entrance back into its regular mode for use by other passengers. This problem is aggravated by the fact that the entrance of such vehicles, e.g. buses, is typical by a step-well located immediately behind the door, the step-well being constructed to occupy as little of the bus plan space as possible in order to attain the optimun use of the bus floor. The reduced size of the step-well, however, poses a considerable problem with respect to the use of the lifting devices of the above type, which is demonstrated by the fact that for instance the bulk or regular public transportation buses do not have any arrangement whereby a wheel chair user may conveniently enter or disembark the bus.

Consequently, it is an object of the present invention to provide the lifting device of the above type which is suitable for use in transportation vehicles of regular type, which provides a quick conversion of the modes of the step-well of such vehicle and which, at the same time, limits the floor space of the vehicle to a negligible degree. Another object of the present invention is to provide a lifting device of the above type which can be relatively easily installed in existing vehicles such as buses, without the need for a considerable modification of the frame and body of the vehicle.

These and other objects of the present invention are accomplished by a hoisting mechanism according to the present invention. The hoist mechanism is of the type having a plurality of platform means providing a plurality of respective movements therebetween and lifting means for lifting or lowering at least some of the platform means. The hoist mechanism is adapted for mounting in a step-well of a transportation vehicle, such as a bus, a railroad car or the like. The step-well is defined at its front end by a door frame of said vehicle, by upright side walls, by an upright end wall and by a horizontal bottom. The mechanism comprises vertical hoisting means arranged to be secured to the floor of the vehicle. The vertical hoisting means supports a first platform means arranged for selective, generally horizontal movement in the direction towards and from the front end of the step-well, to assume an extended position wherein at least a portion of the first platform means extends beyond the front end of the step-well, outside of said vehicle. Alternatively, the first platform means can assume a retracted position wherein a portion of the platform is generally coincident with and forming the bottom of the step-well of the vehicle. The mechanism further comprises intermediate step means extending horizontally forwardly from the rear wall of the step-well and operatively associated with the first platform means to assume a folded position when the first platform means is in said extended position, and to assume an unfolded, generally horizontal, operative position when the first platform means assumes retracted position. The first platform means is arranged to be movable in vertical direction of said hoist means when disposed in said extended position. The first platform means thus can be elevated into coplanar relationship with the floor of the vehicle and lowered below the level of the bottom of the step-well.

Thus, the present invention provides, in general terms, a step-well assembly of a transportation vehicle defined by a bottom, two side walls, one end wall and a door opening. The assembly comprises a lower step platform generally coincident with the bottom of the step-well and at least one intermediate step platform disposed between the level of the lower step platform and the floor level of the vehicle. The lower step platform is arranged for horizontal movement from a retracted position, wherein the front edge is spaced closely inwardly of a generally vertical plane of a door opening of the vehicle associated with said step-well, to an extended position, wherein the front edge extends outwardly of said vehicle, beyong the vertical plane. The lower step platform is adapted to become capable of being moved in vertical direction on assuming its extended position. The lower step platform is operatively connected to the intermediate step platform to bring same from its operative, generally horizontal position to a generally vertical position wherein the lower step platform is in a generally coplanar relationship with one of the side walls of the step-well. The operative connection between the lower step platform and the intermediate step platform is such that the intermediate step platform is in its horizontal position when the lower step platform is retracted, and in its vertical position when the lower step platform is extended. Thus, the intermediate step platform clears the space of the step-well when the lower step platform is extended.

The invention will now be described in greater detail with reference to a preferred embodiment as used in a bus, it being understood, however, that departures can be effected from the embodiment both as to the type of vehicle in which the invention is applied and as far as various details are concerned of the mechanism itself. The invention will be described with reference to the accompanying drawings wherein:

FIG. 4 is a schematic view similar to that of FIG. 3, showing the mechanism as viewed from the front end of the bus;

FIG. 5 is a detail V of FIG. 3, partly in section including details not shown in FIG. 3;

FIG. 6 is a detail of FIG. 4, showing the arrangement of a kick-door panel used in the present invention;

FIG. 7 is a plan view of a locking tab;

FIG. 10 is a plan view, partly in section of the step-well including certain elements of the lifting means.

Figure 1:
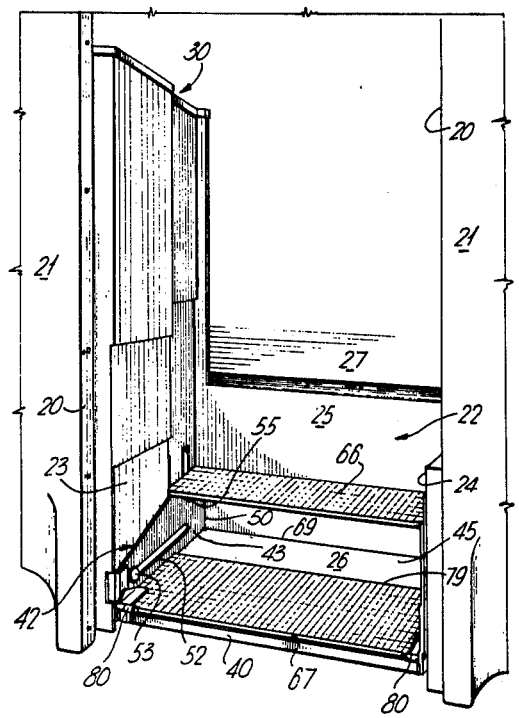
FIG. 1 is a simplified perspective view of a bus entrance showing the basic elements of the step-well in "step" mode.

Turning firstly to FIG. 1, it will be observed that this Figure shows a bus entrance with the door removed for the sake of clarity. The door is, of course, normally pivotal about the sides of a door frame 20. It will be appreciated that the type of door to be used with this type of entrance is that which has two wings each pivotally secured to the respective side of the frame 20 for swinging movement about a vertical pivotal axis outside of the vehicle body 21. The door frame 20 is located at the front end of a step-well 22. In fact, therefore, the plane in which the frame 20 is located defines the front end of the well 22. The well 22 is further defined by two upright side walls 23, 24 by an upright end wall 25 and by a horizontal bottom 26. The upper edge of the end well 25 terminates at the bus floor 27.

Hoist means 30 (FIG. 3, FIG. 4) is provided to one side of the wall 22, adjacent the side wall 23. The overall assembly of the hoist means 30 is fixedly secured, by bolting, to the floor of the bus. As best seen from FIG. 4, the hoist means 30 includes upright bars or rails 29 the top ends of which are connected with one another by a cross beam 32. The cross beam 32 supports a transmission 33 the driven part of which is operatively connected to a drive electric motor 34. Extending downwardly from the transmission 33 is a ball screw 35, engaging a ball nut 36 which, in turn, is fixedly secured to a cross member 38 of the lift fork assembly the upright members 37 of which are arranged for slidable movement in and along the upright bars 31 of the hoist.

Figure 3:
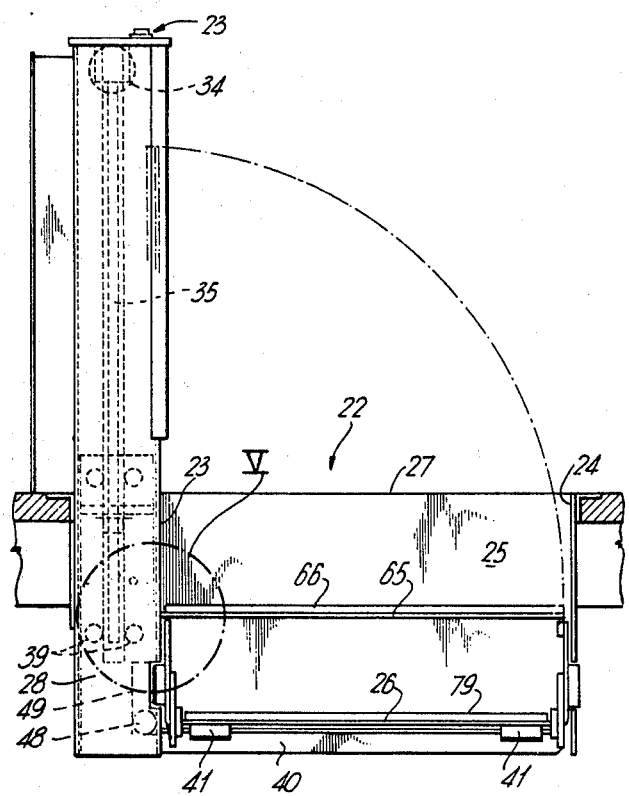
FIG. 3 is a schematic view, partly in section, showing the mechanism as viewed from the bus entrance side, with certain elements omitted for clarity.

As best seen from FIG. 3, the lift fork assembly, generally designated with reference numeral 28, further comprises known elements which do not constitute any part of the present invention, such as cam followers 39 and similar known means for securing a smooth sliding of the assembly 28 in vertical direction, along the ball screw 35. The lower portion of the assembly 28 comprises horizontal extensions 40 which extend almost the full width of the step-well 22.

It will be appreciated from the above that, disregarding further elements to be disclosed hereinafter, the lift fork assembly 38 is capable of a slidable movement in vertical direction. It will thus be apparent that the elements thus far disclosed with respect to the hoisting means can also be referred to, in general terms as "vertical hoisting means arranged to be secured to the floor of the vehicle and located at one side of the step-well.

The horizontal extensions 40 are provided with wear strips 41 (shown only in FIG. 3) which support a cradle 42. The cradle consists, generally, of two upright side walls 43, 44 the lower edges of which blend into a platform 45. It will be appreciated that platform 45 is thus slidable on the wear strips 41 in horizontal direction along the arrow A (FIG. 4). The cradle has a contour of the letter "U" when viewed in the direction of FIG. 3.

Secured to the rear end of the upright side wall 43 of the cradle 42 is a joint 46 supporting the end of a ball screw 47 (FIG. 10) which passes through a nut (not shown) of a worm gear transmission 48 fixedly secured to the lift fork assembly 28 (FIG. 3). The worm gear 48 is provided with an electric motor 49. It will thus be appreciated that the actuation of motor 49 results in a generally horizontal movement of the cradle in a direction towards and from the end of the step-well 22. Two terminal positions of this movement of the cradle are indicated in FIG. 4 (solid lines) and in FIG. 2, respectively, the latter being the extended position and the former being the retracted position of the platform 45 of cradle 42, the platform 45 also being referred to as "first platform means". It will be appreciated that in the state of FIG. 2 the platform 45 extends beyond the door frame 20, i.e. beyond the front end of the step-well 22, outside of the bus. On the contrary, in the retracted position of FIG. 4, the front portion of the platform 45 forms the bottom 26 of the step-well 22, with the front edge 67 of the platform being inside the well, adjacent the door frame 20. The platform 45 can assume the above two terminal positions due to side slots 50 (FIG. 2 showing one of such slots) in the end wall 25 of the well 22 which slots thus allow for passage of the side walls 43, 44, the platform 45 being allowed to pass below the lower edge 69 of the end wall 25.

The cradle 42 is, of course, provided with further guiding means such as rollers, slides etc. for facilitating its horizontal sliding movement as described above.

In summary, therefore, it will be appreciated that the platform 45 can be moved in horizontal direction to extend through the opening for the door of the bus and, as soon as the rear edges of side walls 43, 44 of cradle 42 (FIG. 4) pass into the area of the well 22, beyond the slots 50 and the platform 45 beyond the lower edge 69 of the end wall 25, the cradle 42 can be lifted or lowered, the movements in the two directions being effected by selective operation of the electric motors 49, 34, respectively.

Figure 2:
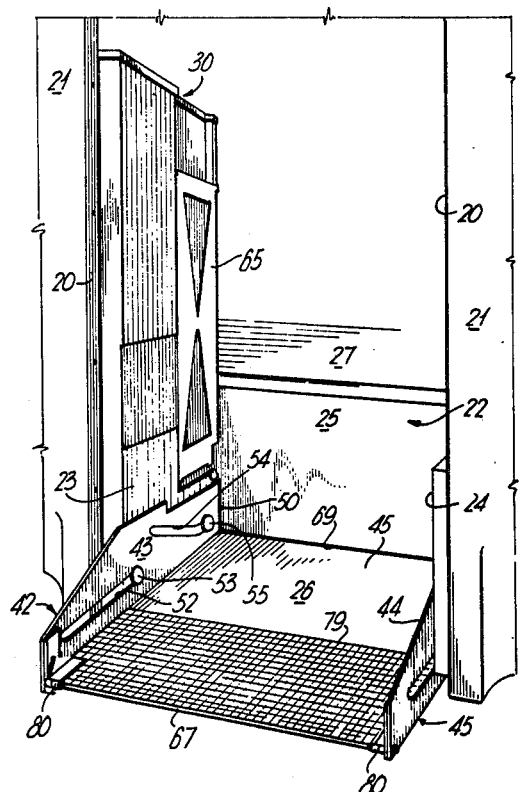
FIG. 2 is a perspective view similar to that of FIG. 1 showing the basic elements of the step-well in "lift" mode.

It will be seen, e.g. from FIG. 2, that the upright wall 43 of the cradle 42 is provided with two guiding slots. The front straight, horizontal slot 52 is arranged to be in engagement with a guide roller 53, the axis of which is fixedly secured to the lift fork assembly 38. The roller 53 together with the slot 52 thus constitutes one of the means for guiding the cradle 42.

The second slot 54 (FIG. 2, FIG. 4), is arranged to engage a roller 55 which forms one end of a mechanism shown in detail in FIG. 5. The mechanism will hereinafter be described in greater detail. The roller 55 is secured to a block 56 which forms an integral part of a sliding link 57. The sliding link 57 is provided with an upright slot 58 engaged by a bolt-and-spacer designated with reference numeral 59. The bolt-and-spacer 59 is secured for pivotal movement about an axis which is fixed with respect to the lift fork assembly 38. The central portion of the slot 58 is guided by a journal (not seen in FIG. 5) which is co-axial with a joint 60. The overall assembly of joint 60 is also secured to the lift fork assembly 38 so that its axis is fixed with respect to the lift fork assembly. The upper left portion of link 57 (FIG. 6) is provided with a horizontally extending slot 61 which engages a guide roller, of which only the fixing nut 62 can be seen in FIG. 5. the firing nut 62 secures its associated roller to one arm 63 of a hinge mechanism pivotable about the axis of the joint 60, another arm 64 of the hinge mechanism being fixedly secured to the former arm 63, whereby both arms 63, 64 are pivotable in common about the axis of the joint 60. The lower end of the arm 64, which has the shape of a bracket, is fixedly secured to a platform 65 of an intermediate step 66 of the step-well 22 (FIG. 1). Consequently, the downward movement of the sliding link 57 causes pivotal movement of arms 63, 64, whereby the axis of the fixing nut 62 and its associated guide roller is forced to circumscribe a 90° arc as shown by arrow C. (FIG. 5). Due to the described relationship between the arms 63, 64 and the platform 65, the latter is lifted by such movement and pivoted about the axis of the joint 60 to an upright position. As best seen in FIG. 2, the platform 65, when lifted to the upright position, clears the area of the step-well and allows for loading of the platform 45 as the intermediate step 66 no longer obstructs the step-well space. The vertical movement of the link 57 is caused by the inclined portion of the slot 54 in the side wall 43 of cradle 42. It will be appreciated from FIG. 4, that with the cradle 42 in retracted position, the roller 55 and thus the sliding link 57 assume the uppermost position shown in FIG. 5, whereas the sliding movement of cradle 42 into its extended position gradually brings the roller 55 to the rear end portion of the slot 54 thus lowering the link 57 to a position corresponding to the terminal point of the arrow D.

It will thus be seen that the intermediate step 66 normally extends horizontally and forwardly from the end wall 25 of the well 22 and is operatively associated with the platform 45 of the cradle 42 to assume a folded, upright position when the platform 45 assumes its extended position, and to return to an unfolded, generally horizontal, operative position when the cradle platform assumes retracted position, the relative movements of the two platforms being communicated by the above described mechanism.

It has been mentioned before that the rear edge 81 (FIG. 10) of platform 45 reaches slightly forwardly of the end wall 25 when the cradle 42 is brought into its extended position. The overall length E (FIG. 10) of the cradle platform 45 is larger than the length F of the step-well 22. Consequently, the portion of platform 45 protruding out of the door frame 20 when the cradle 42 is in extended position amount substantially to E − F. It will thus be observed that the overall length of the platform 45 with respect to the length of the step-well 22 is selected such that the platform 45 covers generally the entire plan area of the step-well regardless of the instant position of the platform.

Thus, in operation, and assuming that the step-well mechanism is in its "step" mode shown in FIG. 1, with the horizontal extensions 40 in an intermediate level position corresponding to the location of the bottom of the step-well, the motor 49 is first actuated to bring the cradle 42 and thus platform 45 into its extended position wherein the front edge 67 of platform 45 extends out of the vehicle beyond the door frame 20, generally by a distance amounting to (E − F). This movement causes the raise of the platform 65 of the intermediate step 66 into upright position as shown in FIG. 2. The terminal point of the extension movement of platform 45 is determined by a limit switch (not shown) or the like, operatively associated with the motor 49. When the platform 45 assumes it fully extended position, the motor 34 is actuated to bring the platform 45 of cradle 42 downwardly, into a position close to the ground 68 (FIG. 4). By alternative actuation of the motor 34, the platform 45 can be lifted into generally coplanar relationship with the bus floor 27. If it is desired to bring the platform 45 back into its retracted position, the lifting mechanism operated by the motor 34 is actuated to bring the platform into the intermediate level position wherein the rear edge 81 of the platform faces the area immediately below the lower edge 69 of the end wall 25, whereupon the platform can be slided horizontally into its retracted position by appropriate actuation of the motor 49.

It will be appreciated that various control means such as end switches, timing relays etc. can be used, if desired, to secure automation of the operation by controlling appropriate sequence of the operation of motors 34, 49.

As mentioned before, the lower edge 69 of the end wall 25 terminates at a level corresponding to the bottom of the step-well 22. The end wall 25 cannot be extended further downwards as it would interfere with the required clearance between the bus body and the ground 68. On the other hand, the platform 45, when in its lowermost position, ready for rolling the wheel chair onto same, is located at a level which is considerably beneath the lower edge 69 of the end wall 25. The free space between the lowered platform 45 and the edge 69 poses a potential danger and it is therefore desirable to close such space. This is effected by a mechanism which will hereinafter be described with reference to FIG. 4 and FIGS. 6 − 9. Referring firstly to FIG. 4, it will be seen that the end wall 25 is provided at its lower edge 69 with a hinge 70 supporting a "kick-door" panel 71. It will be observed from FIG. 4, that the panel 71 is held in its generally horizontal position by support provided by the platform 45 of cradle 42. It will be seen that, in the state of FIG. 4, it is the rear edge 81 of platform 45 that supports the panel 71 in its almost horizontal position.

The above described horizontal sliding movement of the cradle 42 to the left of FIG. 4 will thus result in gradual tilting of panel 71 in the direction of arrow G, until the panel 71 assumes a generally vertical position shown in FIG. 6.

Figure 8:
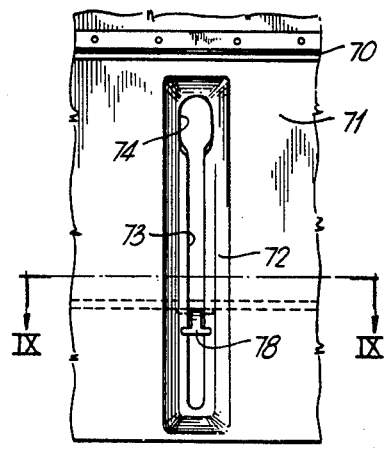
FIG. 8 is a partial perspective view showing a locking groove in the face of the kick-door panel, as viewed in the direction VIII-VIII of FIG. 4.

Also shown in FIG. 6 is a central rib 72 provided in the front face of panel 71. The perspective view of the rib 72 is shown in FIG. 8. The rib 72 has a central slot 73, the upper, terminal portion of which has a broadened entrance 74.

Figure 9:
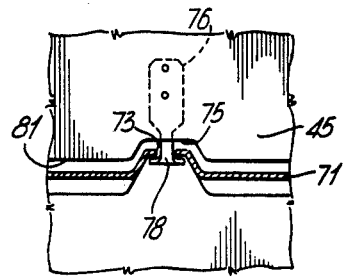
FIG. 9 is section IX—IX of FIG. 8.

Turning back to the platform 45 as seen in FIGS. 6 and 9, it will be seen that the central portion of platform 45 at the rear edge 81 (FIG. 9) is provided with a cutout 75. Fixedly secured to the lower surface of platform 45 is a plastic tab 76. The tab 76 has (FIG. 7) a generally horizontal body portion 77 and a free end portion 76, the free end portion 78 protruding into the cutout 75. As best seen from FIG. 7 or FIG. 9, the free end portion 78 is T-shaped in plan view, the width of the portion 78 being slightly smaller than that of the entrance 74 of the slot 73. Consequently, when the panel 71 assumes vertical position following the sliding movement of platform 45 towards the bus door, the tab free end 78 is located immediately above the broadened entrance 74 of the slot 73, as best seen in FIG. 6. Referring now to FIG. 9, it will be seen that during the following downward movement of the platform 45, the free end 78 of the tab 76 enters the entrance 74 and, subsequently, the remaining portion of the slot 73. Due to the shape of the free end of the tab 76, the tab effectively locks the panel 71 in its upright position when the platform 45 is below the level of the bottom 26 of the step-well 22. The positive locking of the panel 71 prevents the user from having their feet, canes etc. wedged into the space to prevent an injury or at least a delay in the operation of the device. As soon as the platform 45 is lifted to assume the level of the bottom of the step-well 22, the tab 76 disengages the slot 73, however, the panel 71 still remains in its generally upright position as in FIG. 6 during subsequent upward movement of the platform 45. The platform eventually reaches the level of the bus floor (upper position in FIG. 4) whereupon the user of the wheel chair is free to roll the wheel chair off the platform onto the floor 27. The platform 45 is then returned back to its level coincident with the step-well bottom 26 and by subsequent sliding of the platform 45 to the right of FIG. 7, the rear edge 81 of platform 45 engages the surface of panel 71 forcing the panel back into its generally horizontal position as shown in FIG. 4. The term "kick-door" panel used herein is to be understood as meaning a panel pivotally secured about the hinges 70 and free to move about the hinge by pressing against the front surface of the panel. The hinge 70, may, of course, be provided with spring means (not shown) urging the panel into its vertical position. However, it will be appreciated that even the weight of the panel itself will bring same into the position as shown in FIG. 6.

The platform 45 is provided with a flat end lip 79 mounted in hinge 80 for pivotal movement about a horizontal axis generally coincident with the front edge 67 of the platform 45, whereby the lip can assume a folded position shown in FIG. 1 wherein the lip 79 is coincident with the front end of the surface of the platform 45. In this position, the bottom face of the lip 79 faces up and is provided with a grill type surface as best seen in FIG. 1 or FIG. 2. In an unfolded position, the lip can be lifted and pivoted outwardly to form a ramp referred to with reference numeral 79 in the schematic drawing of FIG. 4. It will be readily conceived that the lip 79 can also be provided with additional features which are not shown on the present drawing. For instance, the lip can be provided with control means for remote operation of the unfolding of same. It can also be arranged so as to assume a generally vertical position during the lifting of platform 45 to provide a further safety feature preventing the wheel chair to inadvertently roll off the platform 45. The providing of the bottom surface (which, in folded state, is on top) with a grill type surface shows that the lip 79 is utilized for dual purposes; as a ramp in extended position and as a step grill in folded position.

As mentioned hereinbefore, the above description is to be considered as a preferred embodiment of the present invention. Those skilled in the art will readily conceive many modifications of the present invention, departing more or less substantially from the above embodiment. For instance, the type of drive of the lifting mechanism or of the sliding of the cradle 42 can be different from the one disclosed. One can use, e.g. a hydraulic piston-cylinder mechanism. The actual control of the device can be fully automated by using known control elements. The folding or unfolding of the end lip 79 can be fully automated. One can even contemplate a solution wherein the lifting mechanism is located beneath the platform 42 rather than to the side of the step-well. These and many other departures from the shown embodiment, however, still fall within the scope of the present invention as they do not depart from the scope of the accompanying claims.

The embodiments of the present invention in which an exclusive property or privilege is claimed are defined as follows:

1. A hoist mechanism of the type having a plurality of platform means providing a plurality of respective movements therebetween the lifting means for lifting of lowering at least some of said platform means, said hoist mechanism being adapted for mounting in a step-well of a transportation vehicle, said step-well being defined, at its front end, by a door frame of said vehicle, by upright side walls, by an upright end wall and by a horizontal bottom, said mechanism comprising: vertical hoisting means arranged to be secured to the floor of said vehicle; said vertical hoisting means supporting a first platform means arranged for selective, generally horizontal movement in the direction towards and from the front end of said stepwell, to assume an extended position wherein at least a portion of said first platform means extends beyond the front end of said step-well, outside of said vehicle, or to assume a retracted position wherein a portion of said platform is generally coincident with and forming the bottom of the step-well of said vehicle; and intermediate step means extending horizontally forwardly from said rear wall and operatively associated with said first platform means to assume a folded position when the first platform means is in said extended position, and to assume an unfolded, generally horizontal, operative position when the first platform means assumes retracted position; said first platform being arranged to be movable in vertical direction of said hoist means when disposed in said extended position, whereby the first platform can be elevated into coplanar relationship with the floor of said vehicle, and lowered below the level of the bottom of said step-well.

2. A step-well assembly of a transportation vehicle defined by a bottom, two side walls, one end wall and by a door opening, said assembly comprising a lower step platform generally coincident with the bottom of said step-well and at least one intermediate step platform disposed between the level of said lower step platform and the floor level of said vehicle wherein said lower step platform is arranged for horizontal movement from a retracted position wherein the front edge of same is spaced closely inwardly of a generally vertical plane of a door opening associated with said step-well of the vehicle, to an extended position, wherein said front edge extends outwardly of said vehicle, beyond said vertical plane; said lower step platform being adapted to become capable of being moved in vertical direction on assuming said extended position; said lower step platform being operatively connected to said intermediate step platform to bring same from its operative, generally horizontal position to a generally vertical position wherein the intermediate step platform is in a generally coplanar relationship with one of the side walls of the step-well; the operative connection between the lower step platform and the intermediate step platform being such that the intermediate step platform is in its horizontal position when the lower step platform is retracted, and in its vertical position when the lower step platform is extended; whereby said intermediate step platform clear the space of the step-well when the lower step platform is extended.

3. A device as claimed in claim 1, wherein the width of the lower step platform is substantially the same as that of the step-well of the vehicle, the length of said platform being slightly less than the sum of the length of the step-well and of the length of the portion of said lower step platform protruding beyond the door opening of the vehicle when the lower step platform is in its extended position, whereby the lower step platform covers generally the entire plan area of the step-well regardless of the instant position of the lower step platform.

4. A device as claimed in claim 1 further comprising a kick-door panel arranged for pivotal movement about a horizontal axis generally coincident with and extending across of the rear wall of the step-well at a level generally concident with that of the bottom of said step-well, said kick-door panel being movable from a generally horizontal position wherein the panel extends beyond the rear wall of the well, to a generally vertical position, wherein the panel forms a downwardly extending continuation of the rear wall of the wall, responsive to the enotension of said lower step platform.

5. A device as claimed in claim 4, wherein a kick-door panel is provided with lock means arranged to lock the panel in a vertical position when the lower step platform is located below its level corresponding to the bottom of the step-well.

6. A device as claimed in claim 1, wherein the intermediate step platform is provided with hinge means arranged for pivotal movement of the platform about a horizontal axis generally coincident with one side wall of the well, whereby the folded state of the intermediate step platform is typical by a generally vertical position wherein the intermediate step platform extends upwardly of said hinge means.

7. A device as claimed in claim 6, wherein said vertical hoist means is adjacent to the side of the well coincident with said horizontal axis of the hinge means of the intermediate step platform.

8. A device as claimed in claim 1, wherein the lower step platform is provided with a flat end lip pivotal about a horizontal axis generally coincident with the front edge of the lower step platform, whereby the lip can assume a folded position wherein the lip is coincident with the front end of the surface of the lower step platform, with the bottom face of the lip facing up, to an unfolded position wherein the lip forms a ramp extending downwardly and obliquely from the front edge of the lower step platform, to facilitate the loading of said lower step platform.

9. A device as claimed in claim 8, wherein the bottom surface of the lip is a grill-type surface, whereby the lip in its folded position forms a step-on surface of the lower step platform.

10. A device as claimed in claim 2 wherein the width of the lower step platform is substantially the same as that of the step-well of the vehicle, the length of said platform being slightly less than the sum of the length of the step-well and of the portion of said lower step platform protruding beyond the door opening of the vehicle when the lower step platform is in its extended position, whereby the lower step platform covers generally the entire plan area of the step-well regardless of the instant position of the lower step platform.

11. A device as claimed in claim 2, further comprising a kick-door panel arranged for pivotal movement about a horizontal axis generally coincident with and extending across of the rear wall of the step-well at a level generally coincident with that of the bottom of said step-well, said kick-door panel being movable from a generally horizontal position wherein the panel extends beyond the rear wall of the well, to a generally vertical position, wherein the panel forms a downwardly extending continuation of the rear wall of the well, responsive to the extension of said lower step platform.

12. A device as claimed in claim 11, wherein a kick-door panel is provided with lock means arranged to lock the panel in a vertical position when the lower step platform is located below its level corresponding to the bottom of the stepwell.

13. A device as claimed in claim 2, wherein the intermediate step platform is provided with hinge means arranged for pivotal movement of the platform about a horizontal axis generally coincident with one side wall of the well, whereby the folded state of the intermediate step platform is typical by a generally vertical position wherein the intermediate step platform extends upwardly of said hinge means.

14. A device as claimed in claim 3, wherein the intermediate step platform is provided with hinge means arranged for pivotal movement of the platform about a horizontal axis generally coincident with one side wall of the well, whereby the folded state of the intermediate step platform is typical by a generally vertical position wherein the intermediate step platform extends upwardly of said hinge means.

15. A device as claimed in claim 10, wherein the intermediate step platform is provided with hinge means arranged for pivotal movement of the platform about a horizontal axis generaly coincident with one side wall of the well, whereby the folded state of the intermediate step platform is typical by a generally vertical position wherein the intermediate step platform extends upwardly of said hinge means.

16. A device as claimed in claim 13, wherein said vertical hoist means is adjacent to the side of the well coincident with said horizontal axis of the hinge means of the intermediate step platform.

17. A device as claimed in claim 14, wherein said vertical hoist means is adjacent to the side of the well coincident with said horizontal axis of the hinge means of the intermediate step plateform.

18. A device as claimed in claim 15, wherein said vertical hoist means is adjacent to the side of the well coincident with said horizontal axis of the hinge means of the intermediate step platform.

19. A device as claimed in claim 2, wherein the lower step platform is provided with a flat end lip pivotal about a horizontal axis generally coincident with the front edge of the lower step platform whereby the lip can assume a folded position wherein the lip is coincident with the front end of the surface of the lower step platform with the bottom face of the lip facing up, to an unfolded position wherein the lip forms a ramp extending downwardly and obliquely from the front edge of the lower step platform to facilitate the loading of said lower step platform.

20. A device as claimed in claim 3, wherein the lower step platform is provided with a flat end lip pivotal about a horizontal axis generally coincident with the front edge of the lower step platform whereby the lip can assume a folded position wherein the lip is coincident with the front end of the surface of the lower step platform, with the bottom face of the lip facing up, to an unfolded position wherein the lip forms a ramp extending downwardly and obliquely from the front edge of the lower step platform to facilitate the loading of said lower step platform.

21. A device as claimed in claim 10, wherein the lower step platform is provided with a flat end lip pivotal about a horizontal axis generally coincident with the front edge of the lower step platform whereby the lip can assume a folded position wherein the lip is coincident with the front end of the surface of the lower step platform with the bottom face of the lip facing up, to an unfolded position wherein the lip forms a ramp extending downwardly and obliquely from the front edge of the lower step platform to facilitate the loading of said lower step platform.

* * * * *